UNITED STATES PATENT OFFICE.

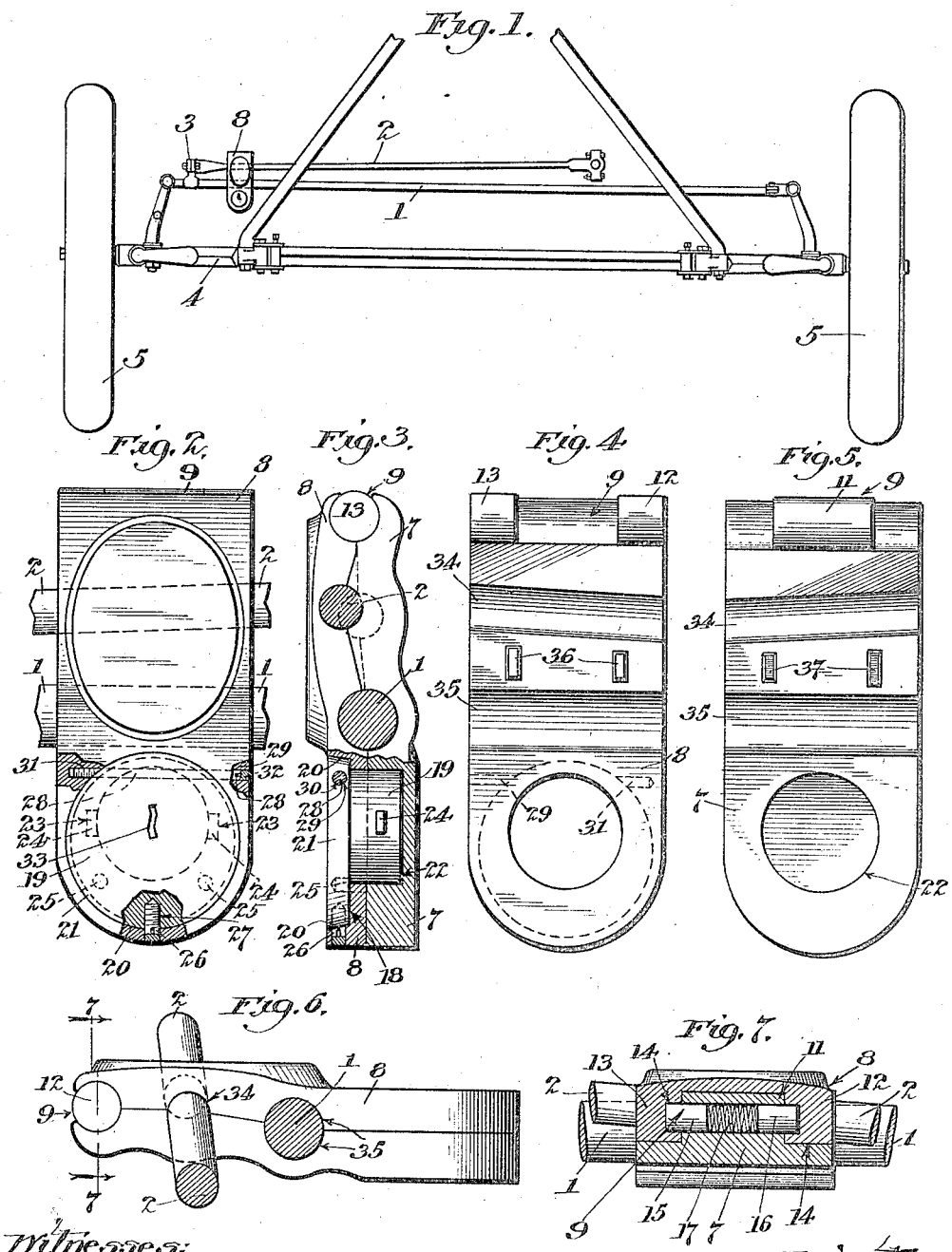

CHARLES POHL, OF LOS ANGELES, CALIFORNIA.

AUTOMOBILE-LOCK.

1,301,498.    Specification of Letters Patent.    Patented Apr. 22, 1919.

Application filed May 16, 1917. Serial No. 168,958.

*To all whom it may concern:*

Be it known that I, CHARLES POHL, a citizen of the United States, residing at Los Angeles, in the county of Los Angeles and State of California, have invented a new and useful Automobile-Lock, of which the following is a specification.

This invention relates to improvements in automobile locks of the type which lock the steering apparatus of an automobile against operation.

An object of the invention is to provide a lock of the above noted character which may be quickly and easily locked upon the steering rods of an automobile so as to prevent theft thereof by the locking or the holding of the steering apparatus against operation, the lock being so constructed that when in position it cannot be picked or removed without the proper key.

Another object of the invention is to provide a lock which is simple in construction, comparatively small, when locked in position is inconspicuous and which is inexpensive to manufacture.

Other objects and advantages will appear in the course of the following description.

The accompanying drawings illustrate the invention:

Figure 1 is a fragmentary plan view of the steering apparatus of an automobile showing the lock in position thereon.

Fig. 2 is a top plan view of the lock being broken away in part to more clearly illustrate the construction thereof.

Fig. 3 is a side elevation of the lock being broken away for the sake of clearness in showing the steering rods within the lock and in section.

Fig. 4 is a detail plan view of one portion of the lock.

Fig. 5 is a detail plan view of the other portion of the lock.

Fig. 6 is a side elevation of the lock showing the rods in section and extending through the lock; and Fig. 7 is a sectional view taken on line 7—7 of Fig. 6.

Referring to the drawings, 1 designates a steering knuckle connecting rod of automobile steering apparatus, and 2 the steering rod connected with the connecting rod as at 3, there also being shown in Fig. 1 of the drawings the axle 4 and wheel 5 of the automobile. The steering apparatus shown in Fig. 1 is of the type used in a great number of well-known automobiles and is practically of standard construction.

The lock comprises similar locking leaves or plates 7 and 8 which in this instance are of rectangular outline hinged to one another at certain ends thereof as at 9. The hinge 9 comprises a hinge barrel 11 formed on the leaf 7 intermediate the side edges of said leaf. This barrel extends between hinge barrels 12 and 13 formed on the corresponding end of the leaf 8, the opposed faces of said barrels 12 and 13 being provided with circular recesses 14 to receive spring-pressed pintles 15 and 16. The pintles 15 and 16 are mounted within the barrel 11 and are pressed outward therefrom into the recesses 14 of the barrels 12 and 13 by an expansion spring 17 mounted within the barrel 11 and abutting the opposed inner ends of the pintles. In assembling the lock, the spring 17 is first positioned within the barrel 11 and the pintles 14 and 15 next inserted within the opposite ends of said barrel and pushed inwardly, compressing the spring so that the barrel 11 may be positioned between the barrels 12 and 13 and caused to register with the recesses 14. When such registration occurs the spring 17 forces the pintles into the barrels 12 and 13 and a permanent hinge is provided, it being impossible to unhinge the leaves without breaking them.

Adjacent to its free end the leaf 8 is provided with a lock receiving opening 18 which receives a preferably cylindrical lock 19. Upon its outer side the opening 18 is enlarged to provide a shoulder 20 to support an annular flange 21 carried by the lock 19. The lock 19 extends through the opening 18 and is adapted to engage within a circular recess 22 formed in the leaf 7, there being provided notches or recesses 23 within the circular wall of the recess 22 to receive the lock lugs or bolts 24 forming a part of the lock 19. Screws 25 are inserted through the leaf 8 from the under or inner face thereof and into the flange 20 of the lock 19 so as to securely hold the lock in place. The heads of the screws in being upon the inner face of the leaf 8 are not accessible when the leaves are locked and this prevents the removal of the lock from the steering rods by unauthorized persons.

A set screw 26 is mounted within the outer end of the leaf 8 and extends within a screw-threaded opening 27 therefor formed in the flange 20 of the lock. As additional means for securely holding the lock, a bolt 28 is inserted into an opening 29 therefor formed in one side face of the leaf 8 and through an opening 30 formed in the flange 20 of the lock. An opening 31 which is screw-threaded corresponding to the opening 29 registers with the opening 30 in the flange 20 and receives the inner end of the bolt, said inner end being screw-threaded. The head of the bolt when the bolt is threaded or turned to its full extent is spaced inwardly from the outer end of the opening 29 and a plug 32 is mounted within said outer end of the opening 29 so as to conceal and prevent removal of the bolt. The lock is provided with a key-hole 33 on the upper side thereof. The hinge 9 serves as a positive lock as well as the lock 19 and the leaves can only be moved apart by inserting the proper key in the key-hole 33 and operating the lock to withdraw the lock lugs 24 from the notches or recesses 23 therefor in the leaf 7.

To provide for the clamping or holding of the rods 1 and 2 between the locking leaves 7 and 8, as shown in Figs. 1, 2, 3, 6 and 7 of the drawings, each leaf is provided with transverse semicylindrical grooves 34 and 35. The grooves 34 and 35 of each leaf register with one another when the leaves are locked together so as to provide approximately circular bores or openings to receive the rods 1 and 2. Inasmuch as the rod 2 is usually smaller in diameter than the rod 1 the grooves 34 are smaller than the grooves 35, said grooves 34 being adapted to receive the rod 2 and since the rod 2 diverges slightly from the end which is secured to the rod 1 toward its other end, relative to the rod 1, said grooves 34 will not lie parallel to the grooves 35 but are disposed in divergent relation thereto. The rod 2 also does not lie in the same horizontal plane as the rod 1, the rod 1 being approximately horizontal, whereas the rod 2 slopes upwardly from its outer end toward its inner end and the grooves 34 are given a corresponding slope, this arrangement being regulated in the leaves by varying the depths of the grooves. It will be seen that on one side of the lock the openings formed by the grooves 34 and 35 are approximately in the same plane, whereas on the other side of the lock the other ends of the groove 34 lie in a much higher plane than the corresponding grooves 35. It will thus be seen that said grooves will readily accommodate themselves to the positions of the steering rods 1 and 2 and when the leaves are locked prevent relative movement of said steering rods so as to hold the steering apparatus against operation, such relative movement of the steering rods being necessary to operate the steering apparatus.

To provide for the proper alinement of the grooves 34 and 35 when the leaves are moved into locking position, there are provided lugs 36 upon the inner face of the leaf 8 which are adapted to extend into openings 37 formed in the opposed face of the leaf 7. These lugs also prevent any relative sidewise motion of the leaves.

To lock the steering apparatus against operation, the leaf 7 is placed with the hinge innermost beneath the steering rods 1 and 2 so that said steering rods will rest in the grooves 34 and 35. The leaf 8 is then brought downwardly over the rods so that the grooves 34 and 35 receive the steering rods and the lock 19 extends into the recess 22. A key, not shown, is then turned within the key-hole 33 so as to cause the locking lugs 24 to engage within the notches 25 therefor and the leaves are locked in position. When the lock is thus placed upon the steering rods, relative movement of the rods is prevented and the steering apparatus is therefore held against operation so that theft of the automobile is prevented. Any attempts by a thief to drive the automobile away would be frustrated in view of the inoperativeness of the steering apparatus. The slight degree of movement permitted the steering apparatus is such that the automobile could only be driven or towed a comparatively short distance.

The essential features of the invention are that the lock cannot be picked or tampered with so as to permit of its removal or slipping upon the rods, the slipping of the lock or sliding thereof upon the rods being prevented by the peculiar relative position of the grooves for the steering rods. The arrangement of the grooves to receive the steering rods is such that the lock may be used in connection with a great many different makes of automobiles without requiring any change in construction thereof.

In the manufacture of my locks, the leaves will be made of hard metal castings or may be otherwise formed of metal so that any attempts to break the lock by the thief in attempting to appropriate the automobile would attract attention. Again the fact that the lock is located beneath the automobile and is not accessible makes attempts to remove or pick the lock very difficult.

I claim:

The combination with the steering knuckle connecting rod and steering rod of an automobile, of similar locking leaves of rectangular outline hinged to one another at one end, a lock inserted in the other end of one of the leaves and engageable with the other end of the other leaf, the adjacent faces of the leaves being irregular and closely fitting one another and being provided with semicircular grooves, the grooves extending transversely to the axis of the lock, the grooves in one leaf registering with those in the other leaf and the grooves being adapted to fit the connecting and steering rods respectively, one of the grooves in each leaf being out of parallelism with the other groove as regards both horizontal and vertical planes passing through the longitudinal axes of the grooves to prevent relative endwise movement between the connecting and steering rods, there being openings in one of the leaves between the grooves therein, and lugs projecting from the other leaf between the grooves therein and engageable with the openings.

Signed at Los Angeles, California, this 9th day of May, 1917.

CHARLES POHL.

Witnesses:
GEORGE H. HILES,
L. BELLE WEAVER.